United States Patent [19]

Grubb et al.

[11] 3,852,416

[45] Dec. 3, 1974

[54] TICK AND FLEA COLLAR OF SOLID SOLUTION PLASTICIZED VINYLIC RESIN-CARBAMATE INSECTICIDE

[76] Inventors: Larry M. Grubb, 3029 High Plateau, Garland, Tex. 75040; James K. Baxter, 920 Waterview Cir., Richardson, Tex. 75080

[22] Filed: Jan. 22, 1973

[21] Appl. No.: 325,714

Related U.S. Application Data

[63] Continuation of Ser. No. 147,664, May 27, 1971, abandoned.

[52] U.S. Cl............ 424/14, 424/15, 424/16, 424/19, 424/22, 424/28, 424/33, 424/78, 424/300, 43/124, 43/131, 43/145, 119/106, 119/156, 119/159
[51] Int. Cl............ A01k 27/00, A01k 29/00, A01m 1/20
[58] Field of Search...... 119/156, 159, 106; 424/14, 424/28, 78, 300; 43/124, 131, 145

[56] References Cited
UNITED STATES PATENTS

| | | | |
|---|---|---|---|
| 2,205,711 | 6/1940 | Banks | 119/156 X |
| 2,219,569 | 10/1940 | Vanderhoof | 119/156 X |
| 2,621,163 | 12/1952 | Coash | 424/78 X |
| 2,734,483 | 2/1956 | Peo | 119/156 |
| 2,788,320 | 4/1957 | Bracey | 204/158 |
| 2,791,202 | 5/1957 | Doyle | 119/156 |
| 2,966,440 | 12/1960 | Gerolt | 424/78 |
| 3,111,539 | 11/1963 | Bocker et al. | 424/300 X |
| 3,400,093 | 9/1968 | Feinberg | 424/78 X |
| 3,404,208 | 10/1968 | Robertson et al. | 424/300 |
| 3,408,323 | 10/1968 | Hackney | 424/78 X |

FOREIGN PATENTS OR APPLICATIONS

| | | |
|---|---|---|
| 796,368 | 6/1958 | Great Britain |
| 999,067 | 7/1965 | Great Britain |

*Primary Examiner*—Shep K. Rose
*Attorney, Agent, or Firm*—Donald W. Erickson

[57] ABSTRACT

Solid pesticidal composition comprising a solid, substantially non-volatile carbamate and a plasticized solid thermoplastic resin characterized by being essentially dry and providing self-replenishing of carbamate particles on the surface of the composition to provide continuous control of ectoparasites on animals.

13 Claims, No Drawings

TICK AND FLEA COLLAR OF SOLID SOLUTION PLASTICIZED VINYLIC RESIN-CARBAMATE INSECTICIDE

This is a continuation of Ser. No. 147,664, filed May 27, 1971, now abandoned.

This invention relates to novel plasticized resin compositions for the control of ectoparasites on animals and to methods for preparing and using the compositions.

Pesticides have been incorporated into natural and synthetic resins, heretofore, to protect the resin from attack by pests or to utilize the resin as a carrier for release of the pesticide to control pests such as insects. The incorporation of a pesticide into a resin to protect the resin from attack is illustrated by U.S. Pat. No. 3,408,323 which describes a composition of thermoplastic resin and a carbamate for preparing cable sheathing and pipe. The use of a resin as the carrier for a pesticide is illustrated by U.S. Pat. No. 3,318,769 which describes compositions of a thermoplastic resin and a volatile liquid pesticide. Compositions comprising a volatile pesticide and a thermoplastic resin as the carrier have been utilized in the form of collars to control ectoparasites on dogs and cats. A disadvantage of collars made of resin and volatile, liquid pesticide is that dermal irritation in the neck area of the animal occurs sometimes which necessitates removal of the collar and thus cessation of control of the ectoparasites. Another disadvantage is that the volatile, liquid pesticide and resin type of collar does not provide sustained, long lasting control of ticks over a large area of the animals body.

It is an object of this invention to provide a solid pesticidal composition for the control of ectoparasites on animals which is non-irritating to the animal. Another object of the present invention is to provide a solid pesticidal composition for long lasting, continuous control of ectoparasites on animals. Another object of the present invention is to provide a solid pesticidal composition for the control of ectoparasites on animals which is adapted for formation into a collar for the animal or a band for attachment to the collar of the animal. Still other objects and meritorious features of this invention will be apparent from the detailed description provided herein.

In accordance with the present invention, a solid pesticidal composition is provided which fulfills the above stated objects.

Briefly stated, the present invention provides a solid pesticidal composition comprising a mixture of an effective amount of a solid, substantially non-volatile carbamate and a plasticized solid thermoplastic resin, the composition being characterized by being essentially dry and having the property of providing a self-replenishing coating of particles of the carbamate on the surface of the composition by migration of the carbamate from the body of the composition, said migration occuring whenever carbamate particles are displaced from the surface of the composition.

Carbamates useful in the compositions of the present invention are represented by the formula:

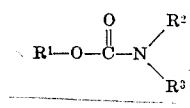

wherein $R^2$ is hydrogen or lower alkyl, $R^3$ is lower alkyl and $R^1$ is aryl, substituted aryl, heterocyclic or substituted heterocyclic groups. The term "lower alkyl," as used herein, refers to an alkyl group, branched or straight chain, having a chain length of one to six carbon atoms. The term "aryl," as used herein, refers to an aryl group such as phenyl or naphthyl. The term "substituted aryl," as used herein, refers to a phenyl or naphthyl group substituted with one or more groups such as lower alkyl, halogen, lower alkoxy, lower alkylamino, lower dialkylamino or lower alkylthio. The term "heterocyclic," as used herein, refers to a organic cyclic group having an oxygen atom, sulfur atom or nitrogen atom in the nucleus thereof and containing up to 12 carbon atoms. The term "substituted heterocyclic," as used herein, refers to a heterocyclic group substituted with one or more groups such as lower alkyl, lower alkoxy, lower alkylthio, lower alkylamino, lower dialkylamino or halogen.

Typical of the carbamates which can be used in the present invention are 2-isopropylphenyl N-methyl carbamate,
2-isopropoxyphenyl N-methyl carbamate,
3-(1-methylbutyl) phenyl N-methyl carbamate,
3-(1-ethylpropyl) phenyl N-methyl carbamate,
6-chloro-3,4-xylenyl N-methyl carbamate,
4-methylthio-3,5-xylenyl N-methyl carbamate,
1-naphthyl N-methyl carbamate,
1-naphthyl N-ethyl carbamate,
1-naphthyl N-isopropyl carbamate,
1-naphthyl N-butyl carbamate,
1-naphthyl N-hexyl carbamate,
1-(4-chloronaphthyl) N-methyl carbamate,
1-(5,6-dihydronaphthyl) N-methyl carbamate,
1-(5,8-dihydronaphthyl) N-methyl carbamate,
4-benzothienyl N-methyl carbamate,
1-phenyl-3-methylpyrazol-5-yl N,N-dimethyl carbamate, dimethyl carbamate, 2-(N,N-dimethyl carbamyl)-3-methylpyrazol-5-yl N,N-dimethyl carbamate, and mixtures thereof. The preparation of carbamates of the above formula has been previously described. See, for example, U.S. Pat. Nos. 2,903,478 and 3,203,853.

To provide an effective amount of carbamate in the compositions of the present invention, there is employed from 3 to 25 percent of the active carbamate (or a mixture of carbamates), and more usually, from about 5 to 15 percent, by weight of the total composition.

In the preparation of the plasticized thermoplastic resin component of the compositions of the present invention, there can be employed any suitable thermoplastic resin which is satisfactorily compatible with the plasticizer employed and the active solid carbamate. For example, in the use of the compositions of the present invention for dog collars to control ectoparasites, the thermoplastic resin needs to have adequate strength and flexibility to withstand shaping into a collar without cracking or crumbling and sufficient durability for the dog to wear for several weeks to a few months. Further, the resin must be one from which the plasticizer will not exude at normal temperatures and conditions and also will permit adequate migration of the active carbamate from the body of the composition to the surface thereof. Similarly, in the case of bands formed of compositions of the present invention for attachment to a collar worn by the animal, sufficient pliability is required for the band to adopt to the shape of the collar. The foregoing requirements of the resin are fulfilled by solid polyvinylic resins, that is, a polymer formed by polymerization through a vinylic double bond. Polyvinylic resins are typified by the polyvinyl halides, such as polyvinyl chloride, polyvinyl chloride-vinyl acetate and polyvinyl fluoride; the polyacylate and polymethacrylate esters such as polymethyl acrylate and polymethyl methacrylate; and polyvinyl benzenes such as polystyrene polyvinyl toluene. The resin comprises from about 35 to 75 percent, usually from 40 to 70 percent, by weight of the total composition.

Plasticizers suitable for preparing the plasticized solid thermoplastic resin component of the compositions of the present invention are those conventionally employed in plasticizing solid thermoplastic resins. The particular plasticizer or plasticizers employed will depend upon the resin and its compatibility therewith. Suitable plasticizers include esters of phosphoric acid such as tricresyl phosphate and esters of phthalic acid such as dioctyl phthalate. Other esters such as those of adipic acid, azelaic acid, maleic acid, rincinoleic acid, myristic acid, palmitic acid, oleic acid, sebacic acid, stearic acid and trimellitic acid as well as complex linear polyesters, polymeric plasticizers, and epoxidized soybean oils. The plasticizer comprises from about 5 to 50 percent, usually 10 to 50 percent by weight of the total composition.

Other ingredients such as stabilizers, lubricants, fillers and coloring materials can be included in the compositions of the present invention without changing the fundamental properties thereof. Suitable stabilizers are the antioxidants and agents which protect the resin from ultraviolet radiation and undue degradation during processing such as extrusion, a wide variety of which are commercially available. Some stabilizers such as epoxidized soybean oils serve also as a secondary plasticizer. Stearates including stearic acid and low molecular weight polyethylene are examples of lubricants which can be used. These ingredients may be used in a concentration of up to about 15 percent by weight of the total composition.

In formulating the solid pesticidal compositions of this invention the various ingredients are mixed and conveniently processed by means of known techniques of dry blend extrusion or injection molding to form a solid fused product in whatever shape is desired. The product can be extruded or molded in an elongated rectangular shape, punched with holes and have a buckle attached for use as an animal collar for dogs and cats.

Without any intention of being bound by theory, it is believed that the preparation of a mixture of a solid carbamate and a plasticized solid thermoplastic resin in accordance with the present invention results in the formation of a solid solution of the carbamate in the plasticized solid thermoplastic resin. This theory is based upon the observation that within a short time, a few days, after being processed into a fused product, e.g., a collar or band, particles or molecules of the carbamate migrate from within the body of the composition and form a coating of particles, resembling a dust or powder, on the surface of the composition. As the particles of carbamate are displaced or shaken from the surface due to the normal activity of the animal, additional particles appear by migration from the body of the composition to replace the amount of carbamate particles displaced from the surface — i.e., the displaced particles are replenished continuously.

Since the particles of carbamate being deposited on the surface of the composition have pesticidal activity the composition acts as a self-replenishing solid pesticide. When carried upon animals in the form of a collar or other device worn by the animal, solid carbamate is shaken from the surface of the collar by the usual movement of the animal resulting in the carbamate being distributed substantially over the entire coat of the animal and effecting its peticidal activity over a large part of the animal's body. In this way, improved tick control is achieved. As some of the pesticide is shaken from the body of the animal in the course of ordinary movement additional pesticide appears on the surface of the composition and replenishes the supply of the pesticidal agent removed from the animal. In the case of dogs and cats, for example, fleas and ticks can be controlled in this manner for a period of up to about 180 days.

The compositions of this invention are generally useful in controlling ectoparasites which infest domestic aminals. They are particularly useful against fleas and ticks. The following examples are provided to illustrate the present invention.

EXAMPLE 1

50 pounds of polyvinyl chloride was placed in a high-speed mixer (Henschel mixer, 1,800 rpm) and 35 pounds of dioctyl phthalate and 4 ¾ pounds of epoxidized soybean oil were added and mixed with the polyvinyl chloride until all of the liquids were absorbed and the resulting mixture was free-flowing. Ten pounds of 1-naphthyl N-methylcarbamate and one-fourth pound of stearic acid were added and mixied briefly. The mixture was then dropped from the mixer and extruded (Killion extruder, 20 inch barrel, one inch bore, barrel and die temperature of about 300°F) into a water bath to provide a one inch strip which is allowed to dry at room temperature.

EXAMPLE 2

The composition of Example 1 was fabricated into dog collars using the process described and placed upon each of 20 dogs. Each dog was artificially impregnated with 50 to 100 fleas. Each dog was placed in a wire cage and a paper placed under each cage to catch the fleas. After 48 hours, the dead fleas on the paper were counted. Then, the collar was removed from the dog and the dog immediately sprayed with a quick knockdown, non-residual aerosol insecticide and placed back into its cage with a new paper. After 4 to 6 hours, the dead fleas on the new paper were counted and the animal removed, washed thoroughly, collar placed back on and artificially reimpregnated with 50 to 100 fleas. This process was repeated every 3 weeks for a period of 13 weeks. Percent control was calculated as the number of dead fleas removed by the collar divided by the number of dead fleas removed by both collar and the non-residual aerosol insecticide. The percent control achieved was 75 percent for a period of 13 weeks.

EXAMPLE 3

The procedure of Example 1 was followed using the following ingredients:

| | |
|---|---|
| Polyvinyl chloride | 51.7% |
| 1-Naphthyl N-methylcarbamate | 10.0% |
| Di-octyl adipate | 35.0% |
| Epoxidized soybean oil | 3.0% |
| Stearic acid | 0.3% |

EXAMPLE 4

The procedure of Example 1 was followed using the following ingredients:

| | |
|---|---|
| Polyvinyl chloride | 55.7% |
| 2-Isopropoxyphenyl N-methylcarbamate | 5.0% |
| Di-octyl phthalate | 35.0% |
| Epoxidized soybean oil | 4.0% |
| Stearic acid | 0.3% |

EXAMPLE 5

The procedure of Example 1 was followed using the following ingredients:

| | |
|---|---|
| Polyvinyl chloride | 51.7% |
| 2-Isopropylphenyl N-methylcarbamate | 10.0% |
| Di-octyl adipate | 35.0% |
| Epoxidized soybean oil | 4.0% |
| Stearic acid | 0.3% |

This composition was tested according to the procedure of Example 2 and found to give 75 percent control of fleas for 13 weeks.

Compositions containing 1-naphthyl N-methylcarbamate and 2-isopropylphenyl N-methyl carbamate, respectively, each containing 5 percent of the carbamate were tested upon cats and found to give 75 percent control of fleas for 13 weeks.

EXAMPLE 6

The same procedure as Example 3 was followed with the exception of using VAGH resin in place of polyvinyl chloride. VAGH resin is a vinyl chloride-vinyl acetate-vinyl alcohol copolymer containing 91 percent vinyl chloride, 3 percent vinyl acetate and 6 percent vinyl alcohol (U.S. Pat. No. 2,512,726).

EXAMPLE 7

Other carbamates which can be used in the compositions of the present invention include:
p-nitrophenyl-N-methyl carbamate,
p-nitrophenyl-N,N-dimethyl carbamate,
1-naphthyl-N-benzyloxy-methyl carbamate,
3,5-diisopropyl phenyl-N-benzyloxy-methyl carbamate,
2-chloro-4,5-xylenyl-N-benzyloxy methyl carbamate,
4-dimethylamino-3,5-xylenyl-N-hydroxy methyl carbamate,
3-(1-methylbutyl)phenyl N-methyl carbamate and 3-(1-ethylpropyl) phenyl N-methyl carbamate,
3-isopropylphenyl N-methyl carbamate,
1-isopropylphenyl-3-methylpyrazol-5-yl N,N-dimethyl carbamate, and
1-isopropyl-3-methylpyrazol-5-yl N,N-dimethyl carbamate.

What is claimed is:

1. In an animal collar having a buckle attached thereto, optionally punched with holes, for the control of fleas and ticks on cats and dogs, the improvement consisting of a solid pesticidal composition, in the form of an elongated band suitable for forming said animal collar for the control of fleas and ticks on cats and dogs, which consists essentially of 5 to 15 percent of a carbamate selected from 1-naphthyl N-methyl carbamate and 2-isopropoxyphenyl N-methyl carbamate; 40 to 70 percent of a solid thermoplastic vinylic resin; and from 10 to 50 percent plasticizer selected from the phthalic esters, adipic esters and phosphoric esters, said percentages, by weight of the total composition, said composition characterized by being essentially dry and the property of providing a self-replenishing coating of particles of the carbamate on the surface of the composition by migration of the carbamate from the body of the composition, said migration occuring whenever carbamate particles are displaced from the surface of the composition.

2. The improvement according to claim 1 wherein the vinyl resin is a homopolymer of vinyl chloride or a copolymer of vinyl chloride and the plasticizer is selected from phthalic esters and adipic esters, said plasticizer being present in the amount of from 25 to 50 percent.

3. The improvement according to claim 2 wherein the carbamate is 1-naphthyl N-methyl carbamate.

4. The improvement according to claim 2 wherein the carbamate is 2-isopropoxyphenyl N-methyl carbamate.

5. The improvement according to claim 3 wherein the resin is polyvinyl chloride.

6. The improvement according to claim 4 wherein the resin is polyvinyl chloride.

7. In a method for the control of fleas and ticks on cats and dogs by the step of providing a buckled collar around the neck of the cat or dog formed of a solid pesticidal composition, the improvement wherein said composition consists essentially of 5 to 15 percent of a carbamate selected from 1-naphthyl N-methyl carbamate and 2-isopropoxyphenyl N-methyl carbamate; 40 to 70 percent of a solid thermoplastic vinylic resin; and from 10 to 50 percent plasticizer selected from the phthalic esters, adipic esters and phosphoris esters, said percentages, by weight of the total composition, said composition characterized by being essentially dry and the property of providing a self-replenishing coating of particles of the carbamate on the surface of the composition by migration of the carbamate from the body of the composition, said migration occuring whenever carbamate particles are displaced from the surface of the composition.

8. The method according to claim 7 wherein the vinyl resin is a homopolymer of vinyl chloride or a copolymer of vinyl chloride and the plasticizer is selected from phthalic esters and adipic esters said plasticizer being present in the amount of from 25 to 50 percent.

9. The method according to claim 8 wherein the carbamate is 1-naphthyl N-methyl carbamate.

10. The method according to claim 8 wherein the carbamate is 2-isopropoxyphenyl N-methyl carbamate.

11. The method according to claim 9 wherein the resin is polyvinyl chloride.

12. The method according to claim 10 wherein the resin is polyvinyl chloride.

13. The improvement according to claim 6 wherein the plasticizer is di-octyl phthalate.

* * * * *